(12) United States Patent
Eiden et al.

(10) Patent No.: US 7,082,316 B2
(45) Date of Patent: Jul. 25, 2006

(54) GROUP CREATION FOR WIRELESS COMMUNICATION TERMINAL

(75) Inventors: Niko Eiden, Helsinki (FI); Kimmo Ollikainen, Helsinki (FI)

(73) Assignee: Nokia Corporation, Espoo (FI)

( * ) Notice: Subject to any disclaimer, the term of this patent is extended or adjusted under 35 U.S.C. 154(b) by 309 days.

(21) Appl. No.: 10/027,501

(22) Filed: Dec. 20, 2001

(65) Prior Publication Data

US 2002/0128030 A1    Sep. 12, 2002

(30) Foreign Application Priority Data

Dec. 27, 2000  (FI)  .................................. 20002861

(51) Int. Cl.
  H04B 7/00   (2006.01)
  H04B 5/00   (2006.01)
  H04M 3/42   (2006.01)
  H04Q 7/00   (2006.01)

(52) U.S. Cl. .................... 455/519; 455/41.1; 455/41.2; 455/416; 455/518; 340/7.46

(58) Field of Classification Search ............... 455/41.1, 455/41.2, 414, 416, 518, 519, 520, 502, 414.1; 340/7.46

See application file for complete search history.

(56) References Cited

U.S. PATENT DOCUMENTS

| | | | |
|---|---|---|---|
| 5,471,646 A | * | 11/1995 | Schultz ....................... 455/519 |
| 5,511,232 A | * | 4/1996 | O'Dea et al. ................ 455/519 |
| 5,796,827 A | * | 8/1998 | Coppersmith et al. ...... 713/182 |
| 6,104,913 A | * | 8/2000 | McAllister .................. 455/41.1 |
| 6,128,381 A | | 10/2000 | Holmstrom et al. ........ 379/356 |
| 6,223,018 B1 | * | 4/2001 | Fukumoto et al. ......... 455/41.1 |
| 6,275,500 B1 | * | 8/2001 | Callaway et al. ........... 370/449 |
| 6,347,095 B1 | * | 2/2002 | Tang et al. ................. 370/469 |

(Continued)

FOREIGN PATENT DOCUMENTS

EP    1024626 A1    1/1999

(Continued)

OTHER PUBLICATIONS

"Bluetooth—A New Low-Power Radio Interface Providing Short-Range Connectivity" IEEE Proceedings of the IEEE, vol. 88, No. 10, Oct., 2000, pp. 1651-1661.

(Continued)

Primary Examiner—Lester G. Kincaid
Assistant Examiner—Un C. Cho
(74) Attorney, Agent, or Firm—Perman & Green, LLP

(57) ABSTRACT

A method and a communication terminal for establishing a group of wireless terminals are provided. The method comprising the steps of detecting a physical contact between users of the wireless terminals using a first circuit, establishing the group identified in the previous step of physically connected users of the wireless terminals using a second circuit of the wireless terminals. The step of detecting the physical contact comprising the step of transferring a signal via the physical contact between the users of the wireless terminals using the first circuit in the wireless terminals. The step of transferring a signal comprising the steps of generating the signal in the circuit, transferring the generated signal to a body of the user and to a body of a second user the users being physically connected, and detecting the signal in the circuit of the second user. The step of establishing the group comprising the step of confirming the establishment of the group between the users of the wireless terminals using a message that is transmitted using the second circuit.

25 Claims, 8 Drawing Sheets

U.S. PATENT DOCUMENTS 6,430,395 B1 * 8/2002 Arazi et al. ............... 455/41.2
6,441,721 B1 * 8/2002 Tajima et al. ........... 340/286.01
6,542,717 B1 * 4/2003 Zimmerman et al. ....... 455/100

FOREIGN PATENT DOCUMENTS

| GB | 2306725 | 5/1997 |
| GB | 2348085 A | 9/2000 |
| WO | WO 98/54870 | 12/1998 |
| WO | WO 00/30374 | 5/2000 |

OTHER PUBLICATIONS

"Personal Area Networks: Near-Field Intrabody Communication"; T. Zimmerman; IBM Systems Journal, vol. 35, Nos. 3 & 4, 1996; pp. 609-617.

* cited by examiner

| 501 | 502 | 503 |
|---|---|---|
| BD_ADDR | Clock Offset | Class of Device |

Fig. 5

GROUP CREATION FOR WIRELESS COMMUNICATION TERMINAL

BACKGROUND OF THE INVENTION

1. Field of the Invention

The invention relates to a group communication method and a device, a method for forming of a group of terminal devices.

2. Description of the Related Art

Electronic devices become smaller, lower in power requirements, and less expensive, the bodies are adorned with personal information and communication appliances. Such devices include cellular phones, personal digital assistants (PDAs), pocket video games, and pagers. The concept of Personal Area Networks (PANs) is known to illustrate how electronic devices on and near the human body can exchange digital information by capacitively coupling small currents through the body. A low-frequency carrier is used. A prototype PAN system allows users to exchange electronic business cards by shaking hands.

PAN devices are used in worn objects. They are watches, credit cards, eyeglasses, identification badges, belts, waist packs, and shoe insert. Head-mounted PAN devices include headphones, hearing aids, microphones, and head-mounted displays. Shirt pocket PAN devices operate as identification badges. The wristwatch operates as a location for a display, a microphone, a camera, and a speaker. PAN devices incorporating sensors provide medical monitoring for bodily functions (heartbeat, blood pressure, and respiratory rate). Wallet-based PAN devices store information and identify the possessor. Shoe inserts are self-powered and provide a data-link to remote PAN devices located in the workstations and floor transponders that detect the location and identity of people.

Advances in telecommunication systems technology have resulted in a variety of systems and services being available for system users. These systems include cellular telephone systems providing mobile telephone services. The cellular telephone systems provide services that allow subscribers of these systems to increase their accessibility and be reachable, potentially at all times, and as long as the subscribers remain in the service areas covered by their systems.

In a cellular system, a person desiring to contact the cellular subscriber would simply dial the phone number of the cellular subscriber to contact the subscriber at the subscriber's cellular telephone. As long as the cellular subscriber kept the cellular telephone powered on the subscriber would be accessible when located within the coverage area of the cellular system.

Normally the system sets up a call between the cellular telephone or a so-called mobile terminal and another mobile terminal or a subscriber of a public switched telephone network PSTN. Dialing the subscriber number of the mobile terminal or the like sets up a call to the given mobile terminal. In group calls the whole group is called with a single dialed number, i.e. a group number. A group call is a conference call in which all participants may talk in turn and hear one another. An individual mobile radio may belong to a plurality of groups programmed into the mobile radio. The system keeps a file on the base stations associated with the group number of each group. A group call may cover one, several or all base stations within the area of a mobile exchange or a plurality of mobile exchanges.

Some mobile networks include short message services, e.g. SMS is a bi-directional service in GSM for short alphanumeric messages or data in similar form. In SMS it is possible to deliver a message to the mobile terminal even during an established call, and to deliver a message using so-called store-and-forward service, in which the message is stored in the network, if the mobile terminal is unavailable, and forwarded shortly after the mobile terminal can be reached again. In the traditional GSM system data services are based on circuit switched technology providing maximum data transfer rate of 9,6 kbit/s for transparent and non-transparent bearer services for data communication. Along with an increasing data volume, demand for higher transfer rates has arisen so that the GSM system has been developed to include as an extension the so-called General Packet Radio Service (GPRS) as a packet switched data service.

SUMMARY OF THE INVENTION

Accordingly, it is an object of the present invention to enable users and provide a method and a terminal for group communication and for establishing the group between the users based on a physical contact of the users.

In accordance with the invention there is provided a wireless communication terminal and a method for creation or establishment of a group.

According to a first aspect of the invention there is provided a method for establishing a group of at least two wireless terminals for wireless group communication between the at least two wireless terminals, comprising the steps of:

bringing the users of the at least two wireless terminals into a physical contact;

detecting the physical contact between the users of the at least two wireless terminals; and establishing the group of the at least two wireless terminals for group communication over a wireless link between the at least two wireless terminals of the established group.

According to a second aspect of the invention there is provided a wireless communication terminal for group communication with at least one other wireless terminal, comprising:

a detecting element for detecting the physical contact between the user of the wireless terminal and the user of the at least one other wireless terminal;

means for participating in the establishment of the group of the wireless terminal and the at least one other wireless terminal for group communication over a wireless link with the at least one other wireless terminal of the established group; and a transceiver for performing wireless group communication involving the wireless terminal and the at least one other wireless terminal of the established group.

The wireless communication link is preferably a low power radio frequency link, such as a Bluetooth link. The establishment of the group is saved in the memory of each terminal device of the group, whereafter activation of a group communication, such as making a group phone call, or a group messaging in the form of sending text messages or images to the whole group, can be done by activation of the group communication to that particular group. The memory can be arranged in a similar manner as a telephone directory in a mobile phone or as is known as the Contacts directory in e.g. the Nokia 9110 Communicator.

In one embodiment of the invention also a vicinity of the wireless terminals is detected using the communication over the wireless link. Detecting a vicinity of the wireless terminals includes entering a group creation mode in at least two of the wireless terminal. After the user has entered the mode, the method includes inquiring the vicinity of the wireless terminals using the wireless communication to transmit a message from the wireless terminal that has first entered the mode to the second wireless terminal that has entered the mode. The message includes information about the first wireless terminal that initiates the process and it may further include information about the group creation. The entering the group-creating mode preferably includes touching an electrode located on or being in connection to the terminal. The entering into the group creation mode may also include selecting the mode from a menu of the wireless terminal or pressing a particular button.

In an embodiment of the invention detecting the physical contact between the users preferably includes transferring a signal via the physical contact between the users of the wireless terminals. The transferred signal is generated in a signal transceiver, such as a PAN transceiver. The generated signal is transferred to a body of the first user from an electrode connected to the signal transceiver and to a body of a second user when the user are physically connected. A transceiver at the wireless terminal of the second user detects the generated signal. Similarly the signal is received via the bodies of possibly other physically connected users to respective transceivers in their terminals by touching an electrode at their respective terminals. The signal is preferably a low-frequency signal, e.g. less than one megahertz. The physical contact may include a handshake. It may also include another type of contact between the users that may allow the signal to pass between the users. The establishment of the group of the physically connected user of the wireless terminals may be confirmed using a message that may be transmitted using the wireless communication.

In accordance with the invention there is provided a wireless terminal for enabling users to form a group communication. The wireless terminal includes a first circuit or transceiver which is connected to the central controller of the terminal. The first circuit is used for communication between at least two users of a wireless terminal when there is a physical contact between the users in order to form a group. The wireless terminal includes a second circuit or transceiver which is connected to the central controller. The second circuit is for a wireless group communication between the at least two wireless terminals of the established group.

The second circuit is preferably a short-range radio transceiver. The first circuit is preferably a PAN transceiver and a group creation electrode. The first circuit may include a switch to trigger the communication. The switch may also trigger the creation of the group. The central controller may include a processor (CPU), a memory, an input and an output. The physical contact between at least two users (there can be several users that establish a group) may be a handshake between the persons. The physical contact may also be another type of contact between the users that allows the signal to pass between the users. Thus the physical contact may be any contact between the users that enables a small electrical current to flow from a first body of a first user to a second body(s) of a second user(s). The physical contact may also be any contact where a body can exchange digital information coupling capacitively small currents through the body. The signal may be a low frequency signal that can be electric current.

For better understanding of the present invention, together with other and further objects thereof, reference is made to the following description, taken in conjunction with the accompanying drawings, and its scope will be pointed out in the appending claims.

BRIEF DESCRIPTION OF THE DRAWINGS

In the drawings:

The method and the apparatus according to the invention will be described in more detail by means of preferred embodiments, with references to the appended drawings in which:

FIG. 5 illustrates the contents of a ping signal used in the invention.

DETAILED DESCRIPTION OF THE EMBODIMENTS

Figure 1:
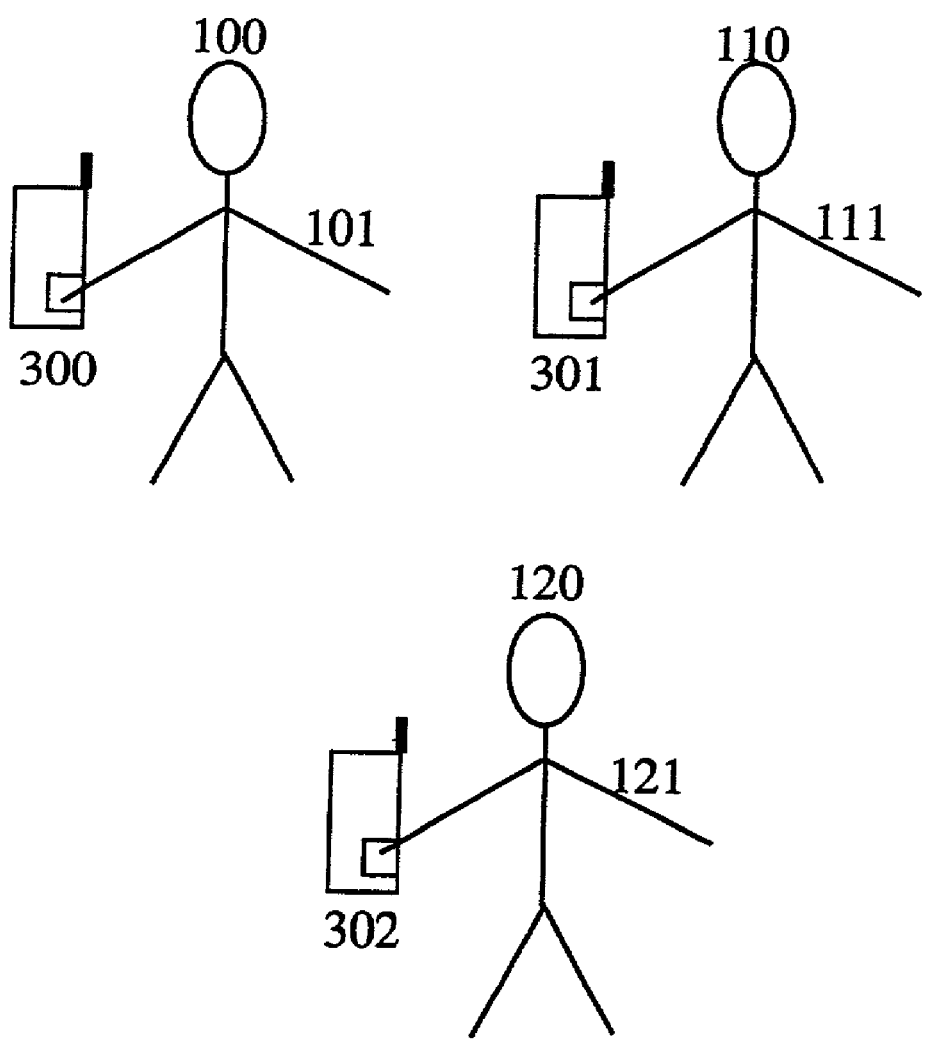
FIG. 1 depicts a communication group of an embodiment of the invention where users may establish the group.

In the example of FIG. 1 wireless terminals establish a communication group. A user 100 has a wireless terminal 300 in his possession. The group has at least two, but preferably several wireless terminals, for example, wireless terminal 300, 301, and 302. Wireless terminal 300 may, for example, be a mobile, a Personal Digital Assistant (PDA), a laptop computer, or any other terminal equipped with a short-range radio communication transceiver or low-power radio communication transceiver. An arm 101 (111 and 121 respectively) of user 100 (110 and 120) may be used in group creation to transfer a signal between the users when the users have a physical connection. One of the wireless terminals, e.g. wireless terminal 300 may function as a master that may have administrative tasks in the group creation. Once the group has been established a wireless network or link is used for a wireless group communication between the wireless terminals 300, 301, and 302.

Figure 2:
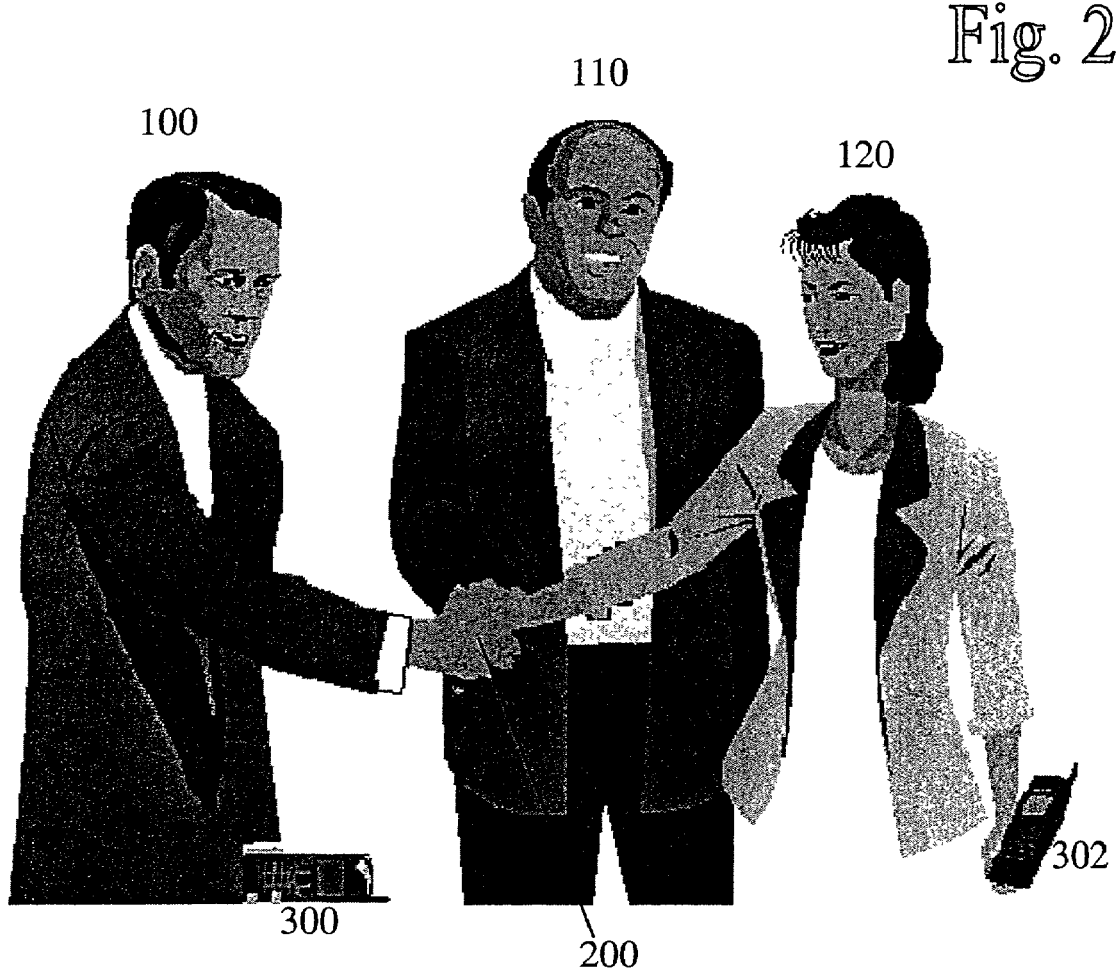
FIG. 2 depicts the physical connection between the users that may be used in group forming.

In the example of FIG. 2 a physical contact 200 is illustrated. Users 100, 110, and 120 touch one another by their hands whereby a physical contact 200 between the users 100, 110, and 120 is established. The physical connection 200 preferably allows a signal to transfer between the users 100, 110, and 120 by capacitively coupling small currents (picoampers) through the body caused by the contact. The source of the signal can be a PAN transceiver in contact with an electrode that one of the users touches (and likewise the signal may be received by a PAN transceiver that another one of the user is in touch with via an electrode). The signal or signals may be transmitted via physical contact 200 between, for example, user 100 and user 120, in which case only users 100 and 120 would be included in the group, but user 110 would be excluded. The signal or signals may also be transmitted via physical contact 200 between all users 100, 110 and 120 under any kind of combination of users, such as by a chain contact. For example, the signal may be transferred from user 100 to users 110 and 120 concurrently. For another example, the signal may be transferred from user 120 via physical contact 200 to user 100. Physical contact 200 may, for example, be a handshake, touching another user's body by touching another user's skin, or any other contact between users where human body can exchange digital information by capacitively coupling small currents (picoampers) through the body. User 100 may hold wireless terminal 300. User 100 can also press an electrode located on the terminal 300 or connected to the terminal (e.g. by wire being a finger sensor that the user can wear on his finger) with his finger to transmit a signal to his body and further to the bodies of the other physically connected users. Respectively user 120 may hold wireless terminal 302 and hold a finger on an electrode or sensor which will receive the signal transmitted from the electrode of terminal 300. Alternatively the user 120 may have an electrode or sensor connected to his body (e.g. to his chest) where the electrode is connected by wire to terminal 302. Every user that is to participate in the group to be established should touch the electrode of his terminal at the same time as being in contact with another user so that a signal is transmitted from one terminal (from the electrode) and received at the other terminals (at their respective electrodes) using the users as a signal transfer medium. Thus user 110 would also need to touch the electrode of his terminal to become a member of the group when in physical contact with the other users 100 and 120.

Figure 3:
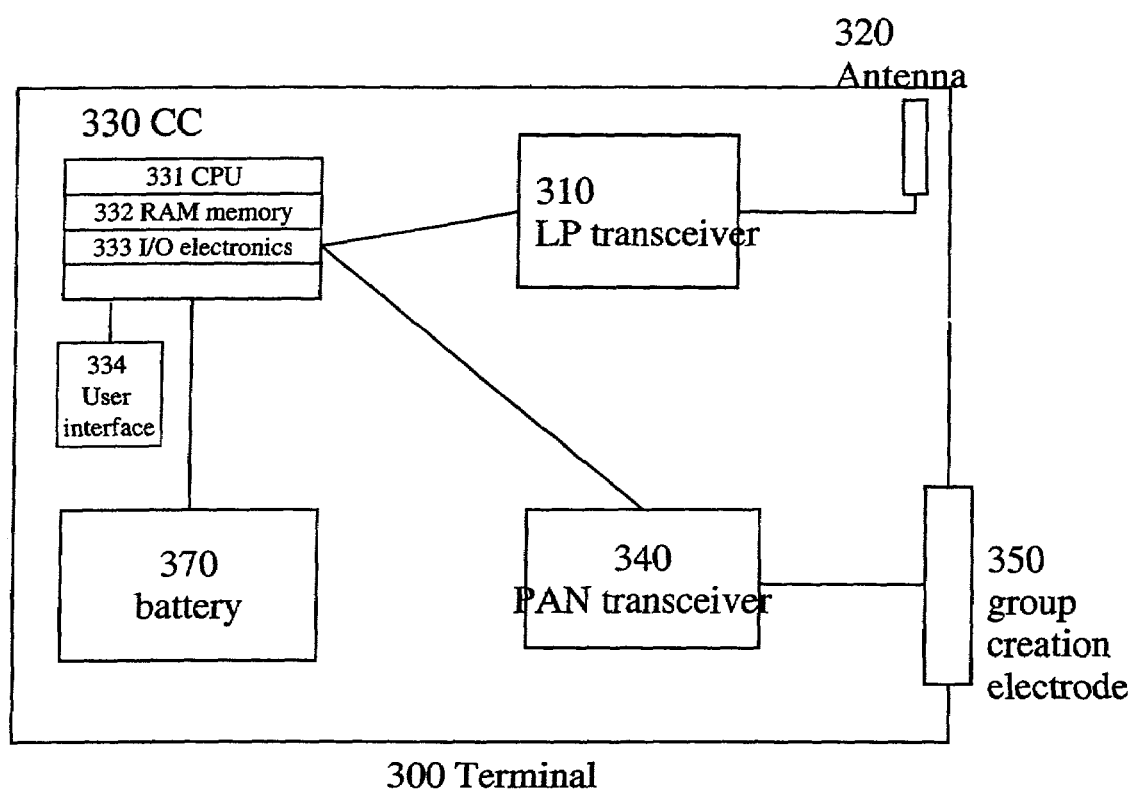
FIG. 3 illustrates a block diagram of a communication terminal of an embodiment of the invention.

In the example of FIG. 3, a block diagram of a wireless terminal 300 is depicted. The implementation of wireless terminals 310 and 320 may of course be the same. Wireless terminal 300 may have a short-range radio communication circuit or transceiver, which here will be called the second circuit. The second circuit is for example a Low Power Radio Frequency (LPRF) transceiver 310 such as a Bluetooth transceiver, utilising an antenna 320, which is connected to the transceiver 310 for radio transmission of information over a radio link. Additionally the wireless terminal may have another antenna (not shown) that can be used to transmit information relating to other radio communication than short-range radio communication, for example, it may be the antenna for communication over a cellular mobile telephone network. Thereby the wireless group communication could take place over the cellular network or over the short range rf communication. If the frequency of the short range radio communication and of the cellular radio network is the same a common antenna could be used. A central controller CC 330 is connected to LP transceiver 310. It may include components that are used to control and operate wireless terminal 300 such as a Central Processor Unit (CPU) 331, a RAM memory 332, input/output (I/O) electronics 333, and be connected to a user interface 334 comprising e.g. a keypad and display. Further a PAN transceiver 340 is connected to the CC 330. In following the PAN transceiver is called a first circuit. In addition to the PAN transceiver 340 the first circuit may include a group creation electrode 350. The PAN transceiver 340 may be used to send and receive signals that are transferred through human bodies and possibly through physical contact 200. Group creation electrode 350 may be used to couple a surface of human body such as a finger to establish a connection, for example, from a first PAN transceiver (located e.g. in wireless terminal 300 in FIG. 2) and first user's body to second user's body and thereby to a second PAN transceiver (located e.g. in wireless terminal 302 in FIG. 2). A ground or earth may be used to establish a circuit that may enable signal (current) to transfer between the users. The return path, earth/ground, may include conductors and dielectrics in the environment that are in close proximity to the PAN transmitters. The earth ground may be electrically isolated to prevent shorting of the communication circuit. The wireless terminal 300 preferably also includes a power source such as a chargeable and releasable battery 370. The user interface 334 of the wireless terminal 300 preferably includes control buttons for controlling other functions of the terminal, for example, browsing the menu or selecting icons, as well as a display for display messages and information relating to the establishment of a group as well as relating to a group communication taking place.

Figure 4A:
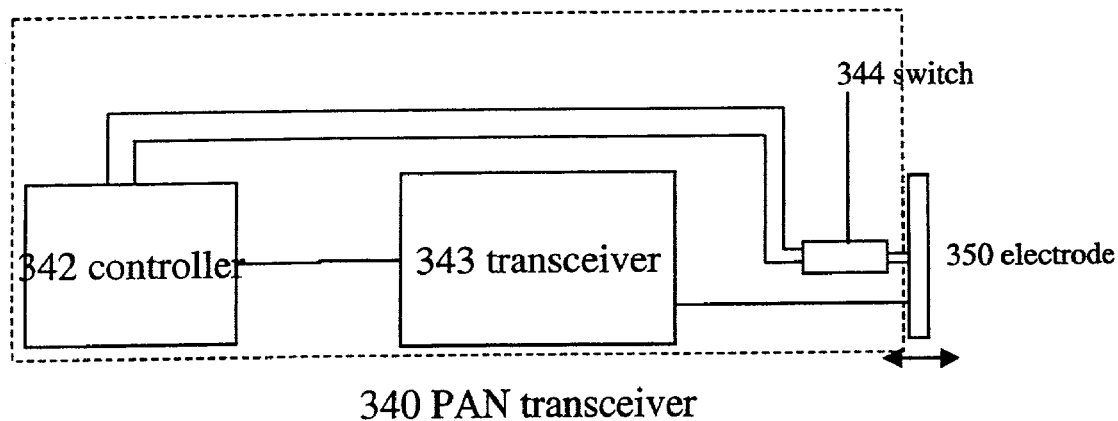
FIG. 4A illustrates a block diagram of an embodiment of the invention where a PAN transceiver is illustrated.

In the example of FIG. 4A an embodiment of a PAN transceiver 340 is illustrated. In this example a controller 342 is connected to a transceiver 343 and to a switch 344. The controller 342 can trigger the transceiver 343 to send a signal and it may activate 343 transceiver either to send or receive the signal. The switch 344 is used to indicate controller 342 to trigger the transceiver 343 to transmit and receive. The switch 344 is connected to an electrode 350. The electrode 350 may shuttle being attached to switch 344. When the electrode 350 moves over a trigger level of the switch 344, the switch 344 indicates controller 342 to give a command to transceiver 343 to turn on for transceiving a signal. Switch 344 may have a restoring force such as a spring to set the electrode 350 to the standby mode when, for example, the user has lifted his finger from the electrode 350.

Figure 4B:
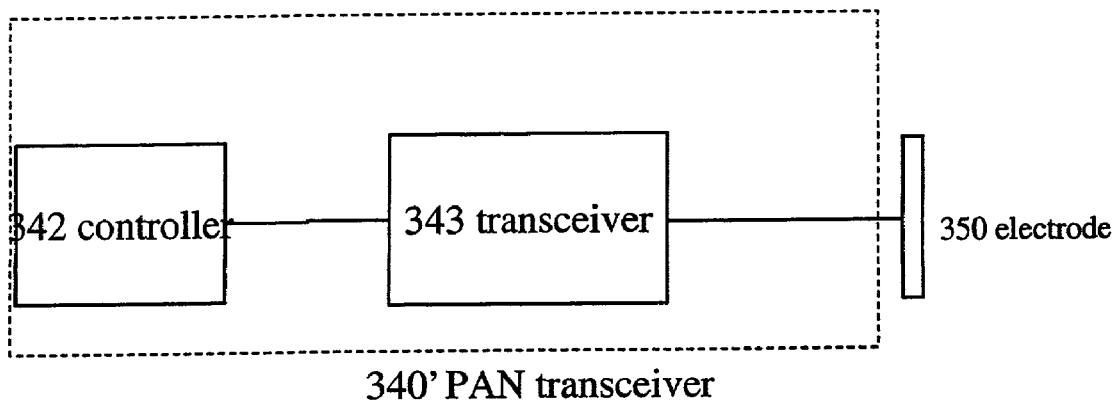
FIG. 4B shows a block diagram of an embodiment of the invention where another PAN transceiver is shown.

In the example of FIG. 4B another embodiment of a PAN transceiver 340' is illustrated. In this embodiment a controller 342 is connected to the transceiver 343. The controller may set transceiver 343 to send the signal or it may activate transceiver 343 either to send or receive the signal. In this embodiment an electrode 350 is connected directly to the transceiver 343. The electrode 350 may also have a connection (not shown) to controller 342. The PAN transceiver 340' may now be triggered or activated to transmit a signal that will be conducted to the body of the person via the electrode 350. The activation can be done by detecting the user touching the electrode, which could be done by e.g. detecting change of capacity at the electrode with the controller 342. The signal transmitted from the electrode 350 is for example a ping signal. The ping signal is preferably a low-frequency signal (less that one megahertz), for example, about 100–1000 KHz AC pulse. The length of the signal will be such that it may be transferable and detectable. A low frequency carrier is used so no energy is propagated, minimizing remote eavesdropping and interference by neighboring PANs.

The transmitted ping signal may be used for inquiring or pinging information by transmitting it from a first wireless user terminal to a second wireless user terminal (there can be more users and terminals than just two). The purpose of transmitting the ping signal is to prepare for a second communication so that the second circuit communication, for example a Bluetooth communication, would not require an inquiry or an extra inquiry when initiating the communication. This speeds up the Bluetooth communication and the setting up of the connection does not consume band of the Bluetooth frequency. In the example of FIG. 5, the contents of a ping signal is illustrated. The signal includes an identifier of the transmitting transceiver, such as an address of second circuit, for example a Bluetooth address 501. Typically each Bluetooth transceiver is allocated a unique 48-bit Bluetooth device address (B_ADDR). The signal may also, though not necessarily, include a clock offset 502. Clock offset 502 is used for synchronization with other units.

The signal may also, though not necessarily, include a class of device 503 such as is known from Bluetooth. Class of device 503 may be 24-bit field containing the class of device of the unit that sends the Frequency Hop Synchronization (FHS) packet. Clock offset 502 and Class of devices 503 are used to make the communication establishment more efficient. However, they are not necessary for the procedure.

Figure 6:
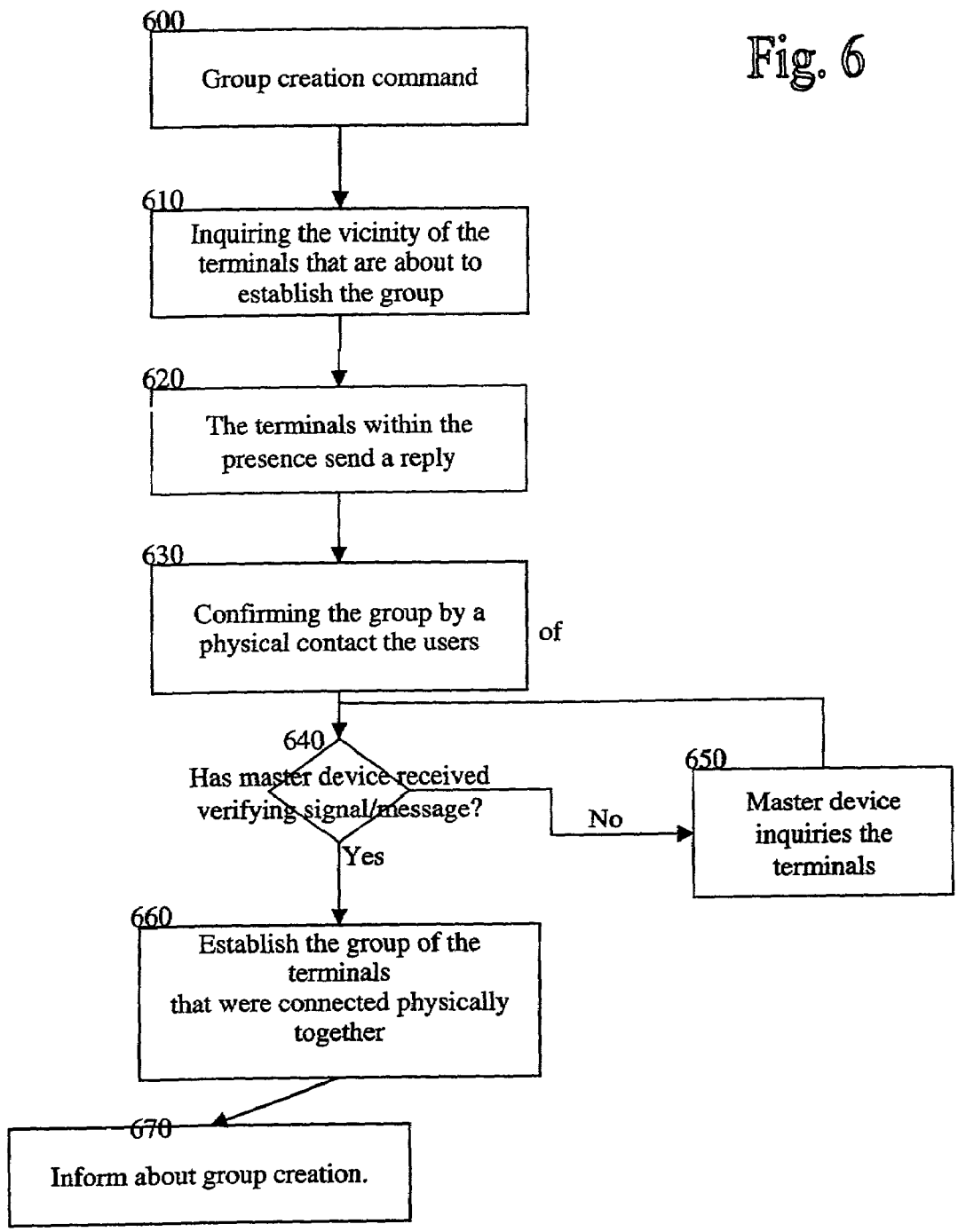
FIG. 6 illustrates a flow diagram of an establishment of a group.

In the example of FIG. 6 a flow chart describing the steps of establishing a group is illustrated. The user 100 (for illustrative purposes user 100 and terminal 300 is selected as shown in FIGS. 1 and 2) may enter a group creation mode at wireless terminal 300 (step 600). The user 100 enters the group creation mode by touching or pressing the electrode 350. Alternatively the user 100 may enter the group creation mode by selecting the mode from a menu of the wireless terminal 100. The user terminal 300 inquires other terminals that may be presence, for example, wireless terminals 301 and 302 (see FIG. 1) that are in the vicinity (step 610). The user terminal 300 transmits a message to the terminals that are located within an operation range of the terminal, such as terminals 301 and 302 by the second circuit transmission (i.e. preferably over Bluetooth). The wireless user terminal 300 that transmits the first inquiring message may be termed as a master. In step 620 the master terminal 300 receives a reply message from the devices that are able to establish the group and that are located within the range. The master terminal selects at least one of the terminals 301 and 302 and sends a message over the wireless link indicating the selection to the terminals 301 and 302 via second circuit transmission. Next, the users confirm the group formation by physical contact 200 of the users (100, 110, 120) and the master terminal 300 sends a signal such as a ping signal to wireless terminals 301 and 302 (step 630). The physical contact 200 may be, for example, a handshake, touching by a finger other user's skin, or any kind of contact between users that may provide current (signal) to flow between the bodies of the users. Via the physical contact an electric circuit is completed, allowing pico amp signal to pass from the transmitter of the first circuit of the master user (100) through the body of the master user (100), to the body of the other user(s) (110 and/or 120), and to the receiver of the other user(s) terminal(s) (301 and/or 302), such as to PAN transceiver 340 in terminals 301 and 302. At this stage the users 100, 110, 120 and the electrodes 350 are coupled. A portion of the user's body, for example, a finger should touch the group creation electrodes 350 at this point (step 630). This process step may really confirm that there exists physical contact 200 between the users of the group (or that are to form the group). The user terminals detect the received signal and register it. The master terminal 300 sends a query to each wireless terminal(s) (301 and/or 302) to ensure each terminal (that participated in the preparation for establishing a group in step 610) successfully received the ping signal (step 640). If some wireless terminal(s) (301 and/or 302) has not received the ping signal, the master 300 will send that terminal a request to send the signal (step 650) or to verify that that terminal does not want to participate in the group. If a particular terminal has not responded by sending a message (over the wireless communication) to the master 300, that terminal is excluded from the group (or could be separately agreed to become a member of the group by a separate wireless communication between the master and that terminal). The master 300 may continue the loop of steps 640 and 650 until the pinging process has been determined successful by replies from the other terminals. After the master 300 has queried all wireless terminals, the group is established using communication over the second circuit (step 660). The master 300 informs at step 670 the other wireless terminals (310 and/or 302) about the successful group creation preferably by use of the second circuit communication. Having established the group the group information is stored in the memory of the central controller CC, such as in a telephone directory like group directory.

Figure 7:
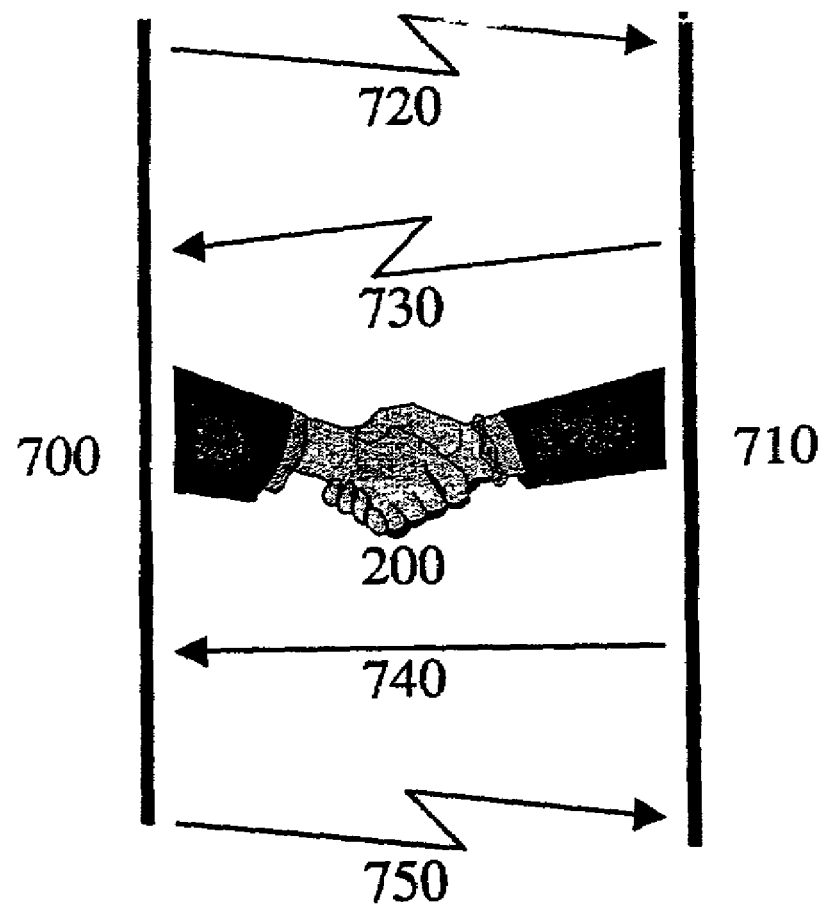
FIG. 7 illustrates a signalling diagram of an establishment of a group.

In the example of FIG. 7, a signalling diagram of an establishment of a group is illustrated. In this example user terminal node 700 (i.e. a first wireless user terminal) transmits a message 720 by use of the second circuit (e.g. Bluetooth) of the terminal. The message includes information about the establishment of the group, and can further include information about the transmitter, protocols, devices, etc. Another user terminal node 710 (i.e. a second wireless user terminal) receives and detects the message likewise by use of the second circuit of the second user terminal. Users then form a physical contact 200 between each other. User terminal node 710 then sends signal 740 to user terminal node 700 over the established physical contact 200 using the first circuit. User terminal node 700 receives over the physical contact and detects this signal 740 using the first circuit (e.g. PAN transceiver). User terminal node 710 then transmits a message 750 to user terminal node 700 to acknowledge the group formation.

In one embodiment the group creation may not require the physical connection of all users at the same time, but in steps. For example, let us assume that wireless terminal (a) will send a ping signal, that will be received at wireless terminals (b) and (d), but not at wireless terminal (c). Next, wireless terminal (c) will send a ping signal that will be received and detected at wireless terminals (b) and (d), but not at wireless terminal (a), so there is missing a direct contact between terminals (a) and (c). However, since there is a connection from wireless terminals (a) and (c) to wireless terminals (b) and (d), there is an indirect connection between (a) and (c) indicating the group establishment. Thus all four terminals (a)–(d) will be forming the group although not all users were in physical contact at the same time, but at different times.

The order and the amount of the signals and messages may vary. For example, the users may have come in physical contact 200 with one another, whereby first wireless terminal sends a signal by the first circuit (PAN), and the group may be formed based on the trigger signal sent by the PAN transceiver. Alternatively, the first wireless terminal may send the message by use of the second circuit and the second wireless user terminal receives it over the wireless communication (Bluetooth) and users then establish physical contact 200 and send the group creation signal to first wireless terminal by the circuit (PAN). The first wireless terminal receives the group creation signal and confirm the establishment of the group by transmitting the confirming message to second wireless terminal by use of the second circuit (Bluetooth). For another example, the first wireless terminal may send the message using the second circuit and a second and a third wireless terminal receive the message and reply to it. The second wireless terminal may now send a signal to first and third wireless terminals via the established physical contact 200 between the users of the wireless terminals. After the signal is sent, the wireless terminals may communicate several messages between themselves using the second circuit and finally the group may be formed and communication may continue.

Figure 8:
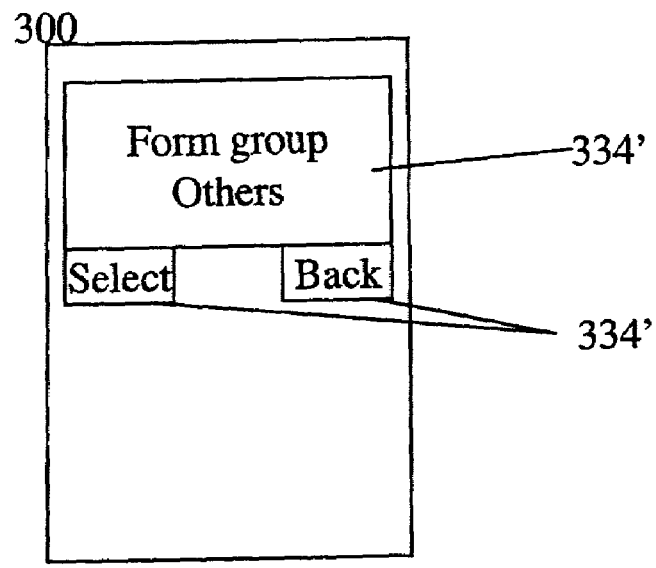
FIG. 8 shows an example of the menu shown at the display of the communication terminal when the group creation mode is selected.

In the example of FIG. 8, the menu at the display of a wireless user terminal is shown when the user selects the group creation mode. The wireless user terminal 300 preferably has a user interface 334' having a display where the menu is shown to the user. On the display there may, for example, be a text menu where "Form group" command indicates that user wants to create the group. Command "Others" may indicate the selection of some other command than those relating to the group formation, for example, edit short-range network settings.

When "Form group" is selected in the menu and the user presses a select button (a part of user interface 334') wireless terminal 300 sends the inquiring message and the group establishment continues as described above.

Figure 9:
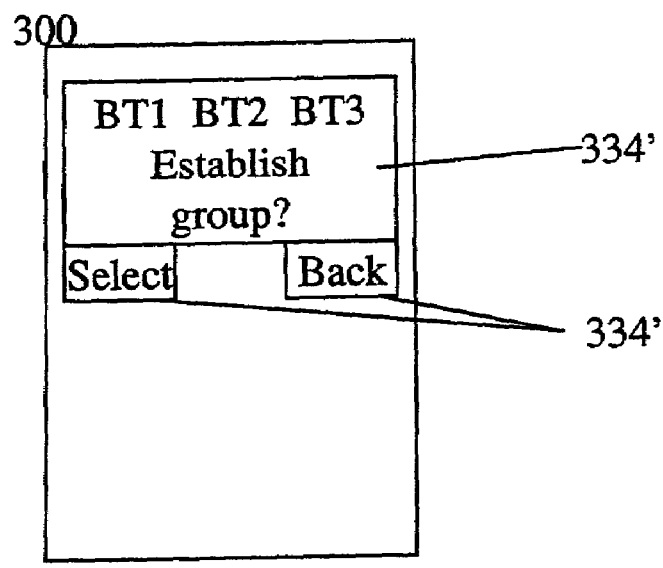
FIG. 9 shows an example about informing, on the display, the terminals which are about to establish the group.

In the example of FIG. 9, the information of the terminals that are about to establish the group is shown. In this situation there may be on the display a text "BT1 BT2 BT3" "Establish group?". The text shows the user that wireless terminals 1, 2, and 3 may form a group. The user acting now as the master may decide whether he wants to establish the group. The user may also decide whether he wants to exclude some terminal from the group. The user of the master terminal may also be allowed to cancel the establishment of the group.

While there has been described what are believed to be the preferred embodiment of the invention, those skilled in the art will recognize that other and further changes and modifications may be made thereto without departing from the scope of the invention.

For example, the identifier used in the signal may be a phone number or International mobile Equipment Identity (IMEI) and the second circuit and further the second circuit communication in the group may be Global Standard for Mobile/Groupe Speciale Mobile (GSM), General Packet Radio (GPRS) or Universal Mobile Telephone System (UMTS).

The invention claimed is:

1. A method for establishing a group of at least two wireless radio terminals for wireless radio group communication between the at least two wireless radio terminals, comprising:
   bringing users of the at least two wireless radio terminals into a physical contact;
   detecting, by a detecting element, the physical contact between the users of the at least two wireless radio terminals; and
   establishing the group of the at least two wireless radio terminals for group communication over a wireless radio link between the at least two wireless radio terminals of the established group, wherein the detecting element is located on each wireless radio terminal.

2. The method of claim 1, further comprising before bringing the users into the physical contact detecting a vicinity of the at least two wireless terminals using wireless communication.

3. The method of claim 2, wherein said detecting the vicinity of the at least two wireless terminals comprises:
   entering the at least two wireless terminals into a group creation mode; and
   inquiring the vicinity of the wireless terminals by transmitting a message from a first wireless terminal of the at least two wireless terminals to a second wireless terminal of the at least two wireless terminals over the wireless communication.

4. The method of claim 3, wherein the message includes information about the first wireless terminal that initiates the process and about the group creation.

5. The method of claim 3, wherein said entering the group creation mode comprises the user of the wireless terminal performing an action on the wireless terminal, the action being one of touching an electrode, selecting said group creating mode from a menu of said wireless terminal, and pressing a button.

6. The method of claim 1, wherein said detecting said physical contact between the users of the at least two wireless terminals comprises:
   transferring a signal via said physical contact between the users of the wireless terminals.

7. The method of claim 6, wherein said transferring said signal comprises:
   generating said signal in one of the at least two wireless terminals;
   transmitting said generated signal to the body of a first user, the first user being the user of the signal generating wireless terminal, and further to the body of a second user being physically connected to the first user; and
   detecting the transmitted signal in the wireless terminal of the second user.

8. The method of claim 6, wherein said signal includes a low-frequency signal.

9. The method of claim 8, wherein the signal frequency is less than 1 megahertz.

10. The method of claim 6, wherein said signal includes at least an address of the transmitting wireless terminal, and optionally at least one of clock offset information, and class of device.

11. The method of claim 6, wherein each wireless terminal comprises a PAN transceiver and a contact electrode for generating and transmitting said signal into the body of the user.

12. The method of claim 1, wherein said physical contact includes one of a handshake and any other contact between the users allowing a signal to pass between the users.

13. The method of claim 1, wherein said establishing said group of the physically connected users of the at least two wireless terminals comprises:
   confirming the establishment of said group between the users of the wireless terminals by transmitting a message to a wireless terminal of the group over the wireless communication.

14. The method of claim 1, wherein each wireless terminal comprises a low power radio transceiver for the wireless communication and an antenna.

15. The method of claim 1, wherein while the users are in the physical contact, each user is also in contact with an electrode further having a connection with the wireless terminal of each respective user.

16. The method of claim 1, wherein said group comprises at least three wireless user terminals.

17. The method of claim 16, wherein said physical contact is a chain contact where one of the users is physically connected to a second one of the users further being in physical contact with a third one of said users.

18. The method of claim 16, wherein each of the users of the group are in physical contact with each other upon forming the group.

19. A radio wireless communication terminal for group communication with at least one other wireless radio terminal, the wireless radio communication terminal comprising:
   a detecting element for detecting physical contact between a user of the wireless radio terminal and a user of the at least one other wireless radio terminal;

means for participating in the establishment of the group of the wireless radio terminal and the at least one other wireless radio terminal for group communication over a wireless radio link with the at least one other wireless radio terminal of the established group; and a transceiver for performing wireless radio group communication involving the wireless radio terminal and the at least one other wireless radio terminal of the established group;

wherein the detecting element is located on the wireless radio communication terminal.

20. The wireless communication terminal of claim 19, wherein said transceiver comprises a short-range radio transceiver and an antenna.

21. The wireless communication terminal of claim 19, wherein said detecting element comprises a PAN transceiver and an electrode for contacting the body of the user.

22. The wireless communication terminal of claim 21, wherein said detecting element further comprises a switch to trigger transmission of a signal to the body of the user when in said physical contact.

23. The terminal of claim 22, wherein said signal includes a low-frequency signal.

24. The terminal of claim 23, wherein the signal frequency includes about 100–1000 KHz.

25. The terminal of claim 19, wherein said physical contact includes one of a handshake, any contact between the users enabling a small electrical current to flow from a first body of a first user to a second body of a second user, and any contact wherein bodies can exchange digital information coupling capacitively small currents through said body.

* * * * *